United States Patent
Bilinski et al.

(10) Patent No.: US 9,877,136 B2
(45) Date of Patent: Jan. 23, 2018

(54) HRTF PERSONALIZATION BASED ON ANTHROPOMETRIC FEATURES

(71) Applicant: MICROSOFT TECHNOLOGY LICENSING, LLC, Redmond, WA (US)

(72) Inventors: Piotr Tadeusz Bilinski, Poznań (PL); Jens Ahrens, Friedberg (DE); Mark R. P. Thomas, Bellevue, WA (US); Ivan J. Tashev, Kirkland, WA (US); John C. Platt, Bellevue, WA (US); David E. Johnston, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 422 days.

(21) Appl. No.: 14/265,154

(22) Filed: Apr. 29, 2014

(65) Prior Publication Data
US 2015/0312694 A1   Oct. 29, 2015

(51) Int. Cl.
*H04R 5/00* (2006.01)
*H04S 7/00* (2006.01)

(52) U.S. Cl.
CPC .......... *H04S 7/302* (2013.01); *H04S 2400/11* (2013.01); *H04S 2420/01* (2013.01)

(58) Field of Classification Search
USPC .................... 381/17, 74, 309, 310
See application file for complete search history.

(56) References Cited

U.S. PATENT DOCUMENTS

| 4,325,381 A | 4/1982 | Glenn |
| 6,996,244 B1 * | 2/2006 | Slaney .............. H04S 1/002 381/17 |
| 7,234,812 B2 | 6/2007 | Piorkowski et al. |
| 8,270,616 B2 | 9/2012 | Slamka et al. |
| 8,767,968 B2 | 7/2014 | Flaks et al. |

(Continued)

FOREIGN PATENT DOCUMENTS

| EP | 2611216 A1 | 7/2013 |
| WO | WO2013111038 A1 | 8/2013 |

OTHER PUBLICATIONS

Andreopoulou, Areti. Head-Related Transfer Function Database Matching Based on Sparse Impulse Response Measurements. New York University, 2013.*

(Continued)

*Primary Examiner* — Joseph Saunders, Jr.
*Assistant Examiner* — James Mooney

(57) ABSTRACT

The derivation of personalized HRTFs for a human subject based on the anthropometric feature parameters of the human subject involves obtaining multiple anthropometric feature parameters and multiple HRTFs of multiple training subjects. Subsequently, multiple anthropometric feature parameters of a human subject are acquired. A representation of the statistical relationship between the plurality of anthropometric feature parameters of the human subject and a subset of the multiple anthropometric feature parameters belonging to the plurality of training subjects is determined. The representation of the statistical relationship is then applied to the multiple HRTFs of the plurality of training subjects to obtain a set of personalized HRTFs for the human subject.

20 Claims, 6 Drawing Sheets

(56) References Cited

U.S. PATENT DOCUMENTS

| | | | |
|---|---|---|---|
| 8,787,584 | B2 | 7/2014 | Nystrom et al. |
| 9,236,024 | B2 | 1/2016 | Coon |
| 9,544,706 | B1 | 1/2017 | Hirst |
| 2003/0138107 | A1* | 7/2003 | Jin ............... A61B 5/1077 381/17 |
| 2007/0183603 | A1 | 8/2007 | Jin et al. |
| 2009/0046864 | A1* | 2/2009 | Mahabub ............ H04S 7/30 381/17 |
| 2009/0238371 | A1* | 9/2009 | Rumsey ............ H04R 29/001 381/58 |
| 2010/0111370 | A1* | 5/2010 | Black ............ G06K 9/00369 382/111 |
| 2012/0183161 | A1 | 7/2012 | Agevik et al. |
| 2012/0237041 | A1* | 9/2012 | Pohle ............... G10L 25/48 381/56 |
| 2012/0328107 | A1 | 12/2012 | Nystrom et al. |
| 2013/0169779 | A1 | 7/2013 | Pedersen |
| 2013/0194107 | A1 | 8/2013 | Nagata |
| 2015/0055937 | A1 | 2/2015 | Van hoff et al. |
| 2015/0156599 | A1 | 6/2015 | Romigh |

OTHER PUBLICATIONS

"Non-negative matrix factorization." Wikipedia. Mar. 26, 2014. Web.*
Lemaire, Vincent, Fabrice Clerot, Sylvain Busson, Rozenn Nicol, and Vincent Choqueuse. "Individualized HRTFs From Few Measurements: a Statistical Learning Approach." IEEE (2005): 2041-46.*
Huang, Qing-hua, and Yong Fang. Modeling personalized head-related impulse response using support vector regression. J Shanghai Univ, 2009. 428-32.*
Ahrens, et al., "HRTF Magnitude Modeling Using a Non-REgularized Least-Squares Fit of Spherical Harmonics Coefficients on Incomplete Data", Proceedings of Asia-Pacific Sgnal and Information Processing Association Annual Summit and Conference, Dec. 2012, 5 pages.
Algazi, et al, "The CIPIC HRTF Database", Proceedings of IEEE Workshop on the Applications of Signal Processing to Audio and Acoustics, Oct. 2001, 4 pages.
Bilinski, "HRTF Personalization using Anthropometric Features", retrieved on Jul. 3, 2014 at <<http://research.microsoft.com/apps/video/defaultaspx?id=201707>>, Microsoft Corporation, 2013.
BoSun, et al., "Head-related transfer function database and its analyses" Proceedings of Science in China Series G: Physics, Mechanics & Astronomy, vol. 50, No. 3, Jun. 2007, 14 pages.
Donoho, "For Most Large Underdetermined Systems of Linear Equations of Minimal 11-Norm Solution is also the Sparsest Solution", Technical Report, Jul. 2004, 30 pages.
Fink, et al., "Tuning Principal Component Weights to Individualize HRTFS", Proceedings of IEEE International Conference on Acoustics, Speech and Signal Processing, Mar. 2012, 4 pages.
Grindlay, et al., "A Multilenear Apprach to HRF Personalization", Proceedings of 32nd International Conference on coustics, Speech, and ignal Processing, Apr. 2007, 4 pages.
Haraszy, et al., "Improved Head Related Transfer Function Generation and Testing for Acoustic Virtual Reality Development" Proceedings of the 14th WSEAS International Conference on Systems: Part of the 14th WSEAS CSCC Multiconference, vol. 2, Jul. 2010, 6 pages.
Hastie, Trevor et al., "The Elements of Statistical Learning Data Mining, Inference, and Prediction", Springer New York, Sep. 15, 2009, pp. 139-189, 219-251, 485-579, and 649-694.
Hoerl, et al., "Ridge regression Biased estimation for Nonorthogonal Problems" Journal of Technometrics, vol. 42, Issue 1, Feb. 2000, 7 pages.
Hu et al., "HRTF personalization based on artificial neural network in individual virtual auditory space", In the Proceedings of the Journal of Applied Acoustics, vol. 69, Iss. 2, Feb. 2009, pp. 163-172.
Huang, et al., "Sparse Representation for Signal Classification", Proceedings of Twenty-First Annual Conference on Neural Information Processing Systems, Dec. 2007, 8 pages.
Kohavi, "A Study of Cross-Validation and Bootstrap for Accuracy Estimaton and Model Selection", Proceedings of the 14th International Joint Conference on Artificial Intelligence, vol. 2, Aug. 1995, 7 pages.
Kukreja, et al., "A Least Absolute Shrinkae and Selection Operator (Lasso) for Nonlinear System Identification", Proceedings N/A, Mar. 2014, 6 pages.
Li, et al., "HRTF Personalization Modeling Based on RBF Neual Network", Proceedings of International Conference on Acoustics, Speech and Signal Proceeding, May 2013, 4 pages.
Luo, et al., "Gaussian Process Data Fusion for the Heterogeneous HRTF Datasets", Proceedings of IEEE Workshop on Applications of Signal Processing to Audio and Acoustics, Oct. 2013, 4 pages.
Mohan, et al., "Using Computer Vision to Generate Customized Spatial Audio", Proceedings of the International Conference on Multimediaand Expo, vol. 3, Jul. 2003, 4 pages.
Rothbucher, et al., "Measuring Anthropometric Data for HRTF Personalization" Sixth International Conference on Signal-Image Technology and Internet Based Systems, Dec. 2010, 5 pages.
Schonstein, et al., "HRTF Selection for Binaural Synthesis from a Database Using Morphological Parameters", Proceedings of 20th International Congress on Acoustics, Aug. 2010, 6 pages.
Spagnol, et al., "On the Relation Between Pinna Reflection Patterns and Head-Related Transfer Function Features", Proceedings of IEEE Transactions on Adio, Speech, and Language Processing, vol. 21, Issue 3, Mar. 2013, 12 pages.
Wagner, et al., "Towards a Practical Face Recognition System: Robust Alignment and Illumination by Sparse Representation" Proceedings of IEEE Transactions on Pattern Analysis and Machine Intelligence, vol. 34, Issue 2, Feb. 2012, 15 pages.
Wahab, et al., "Improved Method for Individualization of Head-Related Transfer Functions on Horizontal Plane Using Reduced Number of Anthropometric Measurements", Journal of Telecommunications, vol. 2, Issue 2, May 2010, 11 pages.
Wright, et al., "Robust Face Recognition via Sparse Representation", IEEE Transactions on Pattern Analysis and Machine Intelligence, vol. 31, No. 2, Feb. 2009, 18 pages.
Zotkin et al., "HRTF Personalization Using Anthropometric Measurements", In the Proceedings of the 2003 IEEE Workshop on Applications of Signal Processing to Audio and Acoustics, Oct. 19, 2003, pp. 157-160.
"Making immersive virtual reality possible in mobile", In White Paper of Qualcomm, Apr. 2016, pp. 1-51.
Aaronson, et al., "Testing, correcting, and extending the Woodworth model for interaural time difference", In the Journal of the Acoustical Society of America, vol. 135, No. 2, Feb. 2014, pp. 817-823.
Abramowitz, et al., "Handbook of mathematical functions, Courier Corporation", In Publication of Courier Corporation, Jun. 1994, 22 pages.
Algazi, et al., "Approximating the head-related transfer function using simple geometric models of the head and torso", In Journal of the Acoustical Society of America, vol. 112, Issue 5, Aug. 1, 2002, pp. 2053-2064.
Algazi, et al., "Estimation of a spherical-head model from anthropometry", In Journal of the Audio Engineering Society, vol. 49, No. 6, Jun. 2001, pp. 1-21.
Amberg, et al., "Optimal step nonrigid ICP algorithms for surface registration", In Proceedings of IEEE Conference on Computer Vision and Pattern Recognition, Jun. 17, 2007, 8 pages.
Bilinski, et al., "HRTF magnitude synthesis via sparse representation of anthropometric features", In Proceedings of IEEE International Conference on Acoustics, Speech and Signal Processing, May 4, 2014, 5 pages.
Constan, Zachary et al., "On the detection of dispersion in the head-related transfer function", In Journal of Acoustical Society of America, vol. 114, Issue 2, Aug. 2003, pp. 998-1008.
Duda, et al., "An adaptable ellipsoidal head model for the interaural time difference", In Proceedings of IEEE International Conference on Acoustics, Speech, and Signal Processing, Mar. 15, 1999, pp. 1-4.

(56) References Cited

OTHER PUBLICATIONS

Erturk, et al., "Efficient representation of 3D human head models", In Proceedings of the British Machine Vision Conference, Sep. 13, 1999, pp. 329-339.

Fliege, et al., "A two-stage approach for computing cubature formulae for the sphere", In Thesis of University of Dortmund, 1996, pp. 1-31.

Fliege, et al., "The distribution of points on the sphere and corresponding cubature formulae", In Journal of IMA Numerical Analysis, vol. 19, Issue 2, Apr. 1, 1999, pp. 317-334.

Funkhouser, et al., "A search engine for 3D models", In Journal ACM Transactions on Graphics, vol. 22, Issue 1, Jan. 2003, pp. 83-105.

Gamper, et al., "Anthropometric parameterisation of a spherical scatterer ITD model with arbitrary ear angles", In Proceedings of IEEE Workshop on Applications of Signal Processing to Audio and Acoustics, Oct. 18, 2015, 5 pages.

Gamper, et al., "Estimation of multipath propagation delays and interaural time differences from 3-D head scans", In Proceedings of IEEE International Conference on Acoustics, Speech and Signal Processing, Apr. 19, 2015, pp. 499-503.

Grijalva, et al., "Anthropometric-based customization of head-related transfer functions using Isomap in the horizontal plane", In Proceedings of IEEE International Conference on Acoustic, Speech and Signal Processing, May 4, 2014, 5 pages.

Guillon, et al., "HRTF customization by frequency scaling and rotation shift based on a new morphological matching method", In Proceedings of 125th Convention of the AES, Oct. 1, 2008, 14 pages.

Haneda, et al., "Common-acoustical-pole and zero modeling of head-related transfer functions", In IEEE transactions on speech and audio processing, vol. 7, Issue 2, Mar. 1999, pp. 188-196.

Harma, et al., "Personalization of headphone spatialization based on the relative localization error in an auditory gaming interface", In AES 132nd Convention, Apr. 26, 2012, 9 pages.

He, et al., "On the preprocessing and postprocessing of HRTF individualization based on sparse representation of anthropometric features", In Proceedings of IEEE International Conference on Acoustic, Speech and Signal Processing, Apr. 19, 2015, 6 pages.

Hertsens, Tyll, "AES Headphone Technology Conference: Head Related Transfer Function", In Audio Engineering Society Headphone Conference, Sep. 1, 2016, 11 pages.

Hu, et al., "HRTF personalization based on multiple regression analysis", In Proceedings of International Conference on Computational Intelligence and Security, vol. 2, Nov. 3, 2006, pp. 1829-1832.

Huttunen, et al., "Rapid generation of personalized HRTFs", In Proceedings of Audio Engineering Society Conference: 55th International Conference on Spatial Audio, Aug. 26, 2014, 6 pages.

Jin, et al., "Creating the Sydney York morphological and acoustic recordings of ears database", In Proceedings IEEE Transactions on Multimedia, vol. 16, Issue 1, Jan. 2014, pp. 37-46.

Jin, et al., "Enabling individualized virtual auditory space using morphological measurements", In Proceedings of the First IEEE Pacific-Rim Conference on Multimedia, Dec. 2000, 4 pages.

Kazhdan, et al., "Rotation invariant spherical harmonic representation of 3D shape descriptors", In Journal of Eurographics Symposium on Geometry Processing, vol. 6, Jun. 23, 2003, pp. 156-165.

Kuhn, George F., "Model for the interaural time differences in the azimuthal plane", In the Journal of the Acoustical Society of America, vol. 62, No. 1, Jul. 1977, pp. 157-167.

Kulkarni, et al., "Sensitivity of human subjects to head-related transfer-function phase spectra", In Journal of Acoustical Society of America, vol. 105, Issue 5, May 1999, pp. 2821-2840.

Lalwani, Mona, "3D audio is the secret to HoloLens' convincing holograms", published Feb. 11, 2016, 17 pgs.

McMullen, et al., "Subjective selection of HRTFs based on spectral coloration and interaural time difference cues", In Proceedings of AES 132rd Convention, Oct. 26, 2012, pp. 1-9.

Meshram, et al., "Efficient HRTF Computation using Adaptive Rectangular Decomposition", In Proceedings of Audio Engineering Society Conference: 55th International Conference on Spatial Audio, Aug. 27, 2014, 9 pages.

Mokhtari, et al., "Computer simulation of HRTFs for personalization of 3D audio", In Proceedings of Second International Symposium on Universal Communication, Dec. 15, 2008, pp. 435-440.

Pei, et al., "3D rotation estimation using discrete spherical harmonic oscillator transforms", In Proceedings of IEEE International Conference on Acoustics, Speech and Signal Processing, May 5, 2014, 20 pages.

Pei, et al., "Discrete spherical harmonic oscillator transforms on the cartesian grids using transformation coefficients", In Journal of IEEE Transactions on Signal Processing, vol. 61, Issue 5, Mar. 1, 2013, pp. 1149-1164.

Huang, Qing-hua, and Fang, Yong, "Modeling personalized head-related impulse response using support vector regression", J. Shanghai Univ, 2009, pp. 428-432.

Satarzadeh, et al., "Physical and filter pinna models based on anthropometry", In Proceedings of Presented at the 122nd Convention of Audio Engineering Society, May 5, 2007, pp. 1-21.

Sunder, et al., "Individualization of Head-Related Transfer Functions in the Median Plane using Frontal Projection Headphones", In Journal of Audio Engineering Society, vol. 64, No. 12, Dec. 27, 2016, 1 page.

Tashev, Ivan, "Audio challenges in virtual and augmented reality devices", In Proceedings of IEEE International Workshop on Acoustic Signal Enhancement, Sep. 15, 2016, pp. 1-44.

Tashev, Ivan, "HRTF phase synthesis via sparse representation of anthropometric features", In Proceedings of Information Theory and Applications, Feb. 9, 2014, 5 pages.

Wahab, et al., "The Effectiveness of Chosen Partial Anthropometric Measurements in Individualizing Head-Related Transfer Functions on Median Plane", In ITB Journal of Information and Communication Technology, vol. 5, Issue 1, May 2011, pp. 35-56.

Wang, et al., "Rotational invariance based on Fourier analysis in polar and spherical coordinates", In Journal of IEEE transactions on pattern analysis and machine intelligence, vol. 31, Issue 9, Sep. 2009, pp. 1715-1722.

Wightman, et al., "Factors affecting the relative salience of sound localization cues", In Publication of Psychology Press, 1997, 24 pgs.

Xu, et al., "Individualization of Head-Related Transfer Function for Three-Dimensional Virtual Auditory Display: A Review", In Proceedings of International Conference on Virtual Reality, Jul. 22, 2007, pp. 397-407.

Zeng, et al., "A hybrid algorithm for selecting HRTF based on similarity of anthropometric structures", In Journal of Sound and Vibration, vol. 329, Issue 19, Sep. 13, 2010, 14 pgs.

Zolfaghari, et al., "Large deformation diffeomorphic metric mapping and fast-multipole boundary element method provide new insights for binaural acoustics", In Proceedings of IEEE International Conference on Acoustics, Speech and Signal Processing, May 4-9, 2014, pp. 1-5.

Zollofer, et al., "Automatic Reconstruction of Personalized Avatars from 3D Face Scans", In Journal of Computer Animation and Virtual Worlds, vol. 22 Issue 2-3, Apr. 2011, 8 pages.

Zotkin, et al., "Rendering localized spatial audio in a virtual auditory space", In Journal of IEEE Transactions on Multimedia, vol. 6, Issue 4, Aug. 2004, pp. 553-564.

Zotkin, et al., "Virtual audio system customization using visual matching of ear parameters", In Proceedings 16th International Conference on Pattern Recognition, Aug. 11, 2002, pp. 1003-1006.

\* cited by examiner

HRTF PERSONALIZATION BASED ON ANTHROPOMETRIC FEATURES

BACKGROUND

Head-related transfer functions (HRTFs) are acoustic transfer functions that describe the transfer of sound from a sound source position to the entrance of the ear canal of a human subject. HRTFs may be used to process a non-spatial audio signal to generate a HRTF-modified audio signal. The HRTF-modified audio signal may be played back over a pair of headphones that are placed over the ears of the human subject to simulate sounds as coming from various arbitrary locations with respect to the ears of the human subject. Accordingly, HRTFs may be used for a variety of applications, such as 3-dimensional (3D) audio for games, live streaming of audio for events, music performances, audio for virtual reality, and/or other forms of audiovisual-based entertainment.

However, due to anthropometric variability in human subjects, each human subject is likely to have a unique set of HRTFs. For example, the set of HRTFs for a human subject may be affected by anthropometric features such as the circumference of the head, the distance between the ears, neck length, etc. of the human subject. Accordingly, the HRTFs for a human subject are generally measured under anechoic conditions using specialized acoustic measuring equipment, such that the complex interactions between direction, elevation, distance and frequency with respect to the sound source and the ears of the human subject may be captured in the functions. Such measurements may be time consuming to perform. Further, the use of specialized acoustic measuring equipment under anechoic conditions means that the measurement of personalized HRTFs for a large number of human subjects may be difficult or impractical.

SUMMARY

Described herein are techniques for generating personalized head-related transfer functions (HRTFs) for a human subject based on a relationship between the anthropometric features of the human subject and the HRTFs of the human subject. The techniques involve the generation of a training dataset that includes anthropometric feature parameters and measured HRTFs of multiple representative human subjects. The training dataset is then used as the basis for the synthesis of HRTFs for a human subject based on the anthropometric feature parameters obtained for the human subject.

The techniques may rely on the principle that the magnitudes and the phase delays of a set of HRTFs of a human subject may be described by the same sparse combination as the corresponding anthropometric data of the human subject. Accordingly, the HRTF synthesis problem may be formulated as finding a sparse representation of the anthropometric features of the human subject with respect to the anthropometric features in the training dataset. The synthesis problem may be used to derive a sparse vector that represents the anthropometric features of the human subject as a linear superposition of the anthropometric features belonging to a subset of the human subjects from the training dataset. The sparse vector is subsequently applied to HRTF tensor data and HRTF group delay data of the measured HRTFs in the training dataset to obtain the HRTFs for the human subject.

In alternative instances, the imposition of sparsity in the synthesis problem may be substituted with the application of ridge regression to derive a vector that is a minimum representation. In additional instances, the use of a non-negative sparse representation in the synthesis problem may eliminate the use of negative weights during the derivation of the sparse vector.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
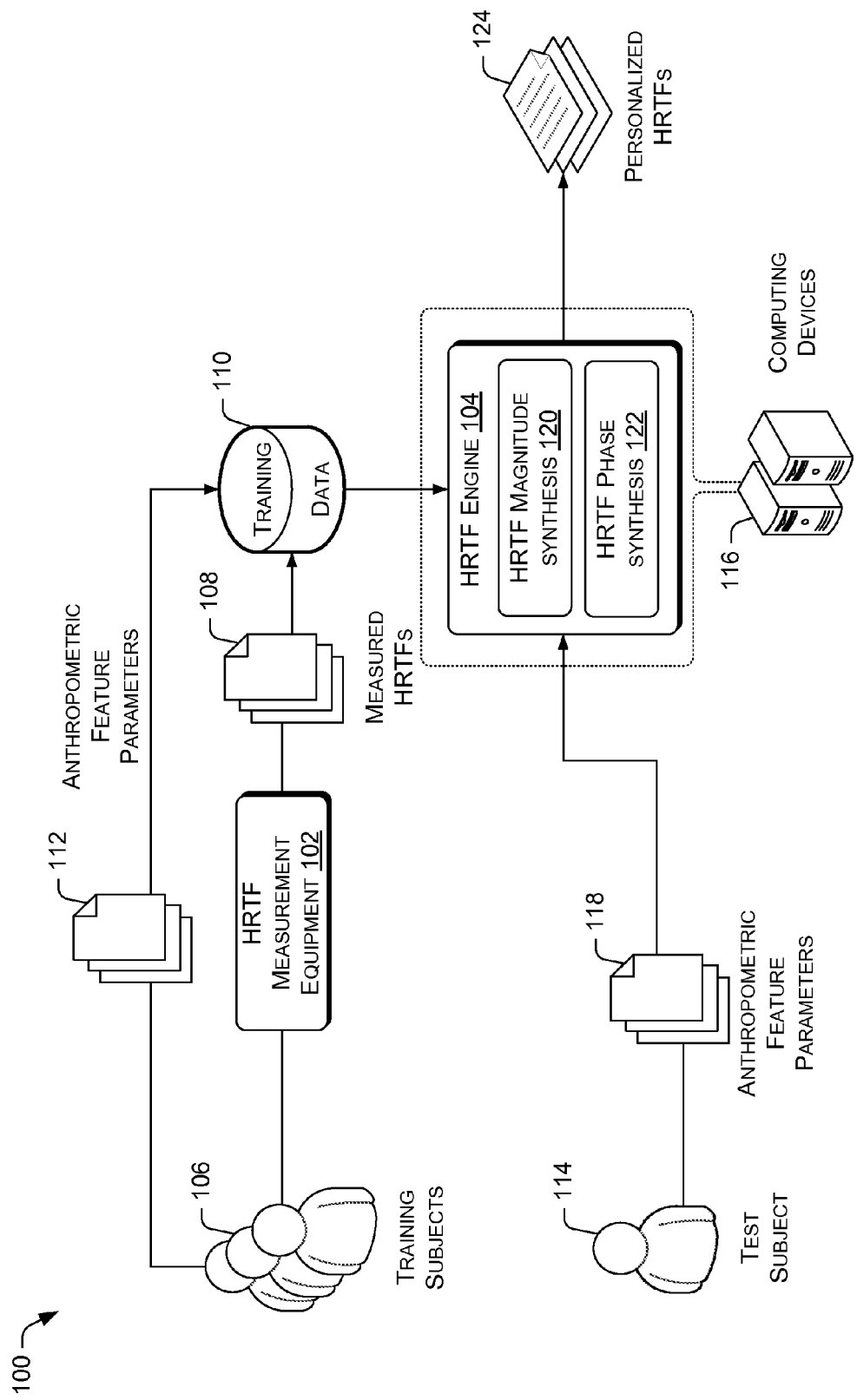
FIG. 1 is a block diagram that illustrates an example scheme for using the anthropometric feature parameters of a human subject to derive personalized HRTFs for a human subject.

Described herein are techniques for generating personalized head-related transfer functions (HRTFs) for a human subject based on a relationship between the anthropometric features of the human subject and the HRTFs of the human subject. The techniques involve the generation of a training dataset that includes anthropometric feature parameters and measured HRTFs of multiple representative human subjects. The training dataset is then used as the basis for the synthesis of HRTFs for a human subject based on the anthropometric feature parameters obtained for the human subject.

The techniques may rely on the principle that the magnitudes and the phase delays of a set of HRTFs of a human subject may be described by the same sparse combination as the corresponding anthropometric data of the human subject. Accordingly, the HRTF synthesis problem may be formulated as finding a sparse representation of the anthropometric features of the human subject with respect to the anthropometric features in the training dataset. The synthesis problem may be used to derive a sparse vector that represents the anthropometric features of the human subject as a linear superposition of the anthropometric features of a subset of the human subjects from the training dataset. The sparse vector is subsequently applied to HRTF tensor data and HRTF group delay data of the measured HRTFs in the training dataset to obtain the HRTFs for the human subject.

In alternative instances, the imposition of sparsity in the synthesis problem may be substituted with the application of ridge regression to derive a vector that is a minimum representation. In additional instances, the use of a non-negative sparse representation in the synthesis problem may eliminate the use of negative weights during the derivation of the sparse vector.

In at least one embodiment, the derivation of personalized HRTFs for a human subject involves obtaining multiple anthropometric feature parameters and multiple HRTFs of multiple training subjects. Subsequently, multiple anthropometric feature parameters of a human subject are acquired. A representation of the statistical relationship between the plurality of anthropometric feature parameters of the human subject and a subset of the multiple anthropometric feature parameters belonging to the plurality of training subjects is determined. The representation of the statistical relationship is then applied to the multiple HRTFs of the plurality of training subjects to obtain a set of personalized HRTFs for the human subject.

Thus, in some embodiments, the statistical relationship may consist of a statistical model that jointly describes both the anthropometric features of the human subject and the HRTFs of the human subject. In other embodiments, the anthropometric features of the human subject and the HRTFs of the human subject may be described using other statistical relationships, such as Bayesian networks, dependency networks, and so forth.

The use of the techniques described herein may enable the rapid derivation of personalized HRTFs for a human subject based on the anthropometric feature parameters of the human subject. Accordingly, this means that personalized HRTFs for the human subject may be obtained without the use of specialized acoustic measuring equipment in an anechoic environment. The relative ease at which the personalized HRTFs are obtained for human subjects may lead to the widespread use of personalized HRTFs to develop personalized 3-dimensional audio experiences. Examples of techniques for generating personalized HRTFs in accordance with various embodiments are described below with reference to FIGS. 1-6.

Example Scheme

FIG. 1 is a block diagram that illustrates an example scheme 100 for using the anthropometric feature parameters of the human subject to derive personalized HRTFs for a human subject. The example scheme 100 may include HRTF measurement equipment 102 and HRTF engine 104. The HRTF measurement equipment 102 may be used to obtain HRTFs from multiple training subjects 106. For example, the training subjects 106 may include 36 human subjects of both genders with an age range from 16 to 61 years old.

In various embodiments, the HRTF measurement equipment 102 may include an array of loudspeakers (e.g., 16 speakers) that are distributed evenly in an arc so as to at least partially surround a seated human subject in a spherical arrangement that excludes a spherical wedge. In at least one embodiment, the spherical wedge may be a 90° spherical wedge, i.e., a wedge that is a quarter of a sphere. However, the spherical wedge may constitute other wedge portions of a sphere in additional embodiments. The array of loudspeakers may be moved to multiple measurement positions (e.g., 25 positions) at multiple steps around the human subject. For example, the array of loud speakers may be moved at steps 11.25° between −45° elevation in front of the human subject to −45° elevation behind the human subject.

The human subject may sit in a chair with his or her head fixed in the center of the arc. Chirp signals of multiple frequencies played by the loudspeakers may be recorded with omni-directional microphones that are placed in the ear canal entrances of the seated human subject. In this way, the HRTF measurement equipment 102 may measure HRTFs for sounds that emanate from multiple positions around the human subject. For example, in an instance in which the chirp signals are emanating from an array of 16 loudspeakers that are moved to 25 array positions, the HRTFs may be measured for a total of 400 positions.

Since the loudspeakers are arranged in a spherical arrangement that partially surrounds the human subject, the HRTF measurement equipment 102 does not directly measure HRTFs at positions underneath the human subject (i.e., within the spherical wedge). Instead, the HRTF measurement equipment 102 may employ a computing device and an interpolation algorithm to derive the HRTFs for virtual positions in the spherical wedge underneath the human subjects. In at least one embodiment, the HRTFs for the virtual t positions may be estimated based on the measured HRTFs using a lower-order non-regularized least-squares fit technique.

Figure 2:
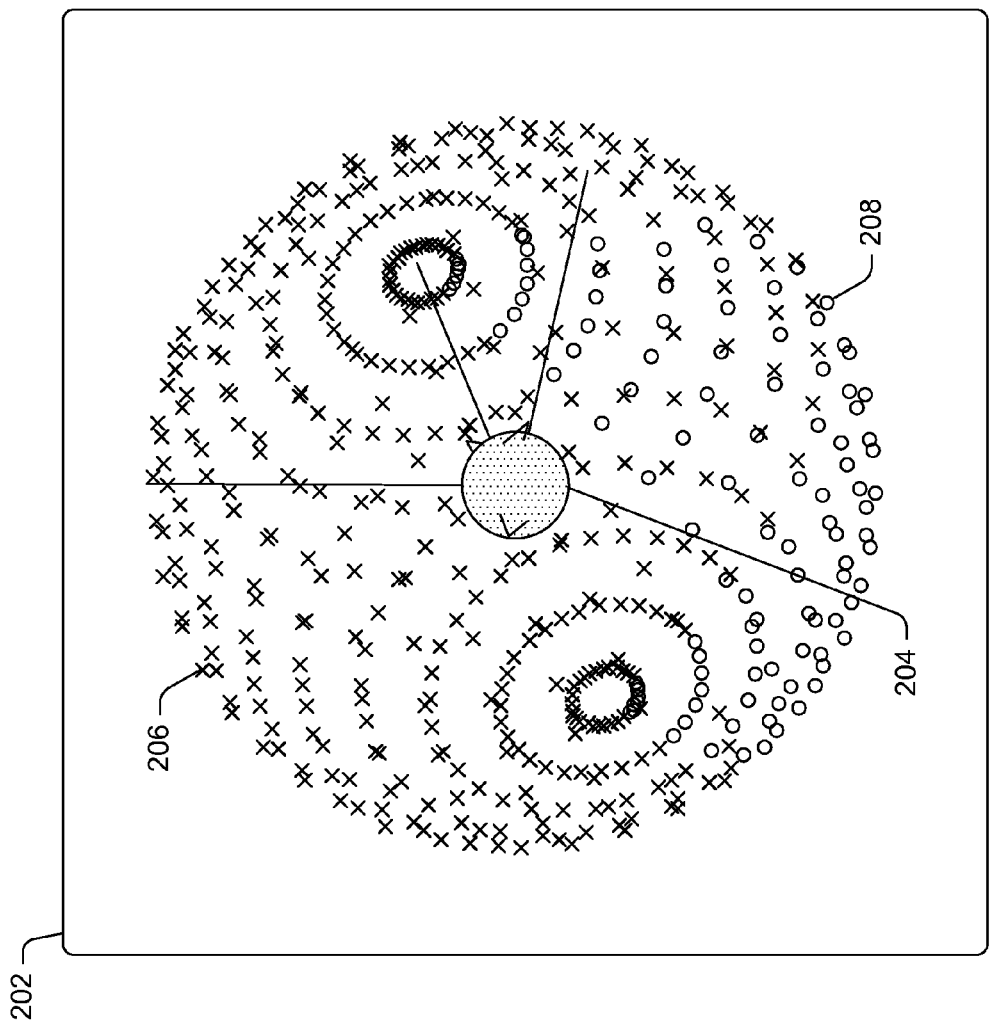
FIG. 2 is an illustrative diagram that shows example actual and virtual sound source positions for the measurement of HRTFs.

FIG. 2 is an illustrative diagram 202 that shows example actual and virtual sound source positions for the measurement of HRTFs. As shown, region 204 may correspond to a position of a training subject (e.g., a head of the training subject). Sound source positions at which loudspeakers may emanate sound for directly measured HRTFs are indicated with "x"s, such as the "x" 206. Conversely, virtual sound positions within a spherical wedge for which HRTFs may be interpolated are indicated with "o"s, such as the "o" 208. However, in other embodiments, the HRTF measurement equipment 102 may provide sounds from sound source positions that completely surround a training subject in a total spherical arrangement. In such embodiments, the HRTF measurement equipment 102 may obtain measured HRTFs for the training subject without the use of interpolation.

Accordingly, in one instance, the HRTF measurement equipment 102 may acquire HRTFs for 512 sound source locations that are each represented by multiple frequency bins for the left and right ears of the human subject. For example, the multiple frequency bins may include 512 frequency bins that range from zero Hertz (Hz) to 24 kilohertz (kHz). The HRTF measurement equipment 102 may be used to obtain measured HRTFs 108 for the multiple training subjects 106. In various embodiments, the HRTFs of each training subject may be represented as a set of frequency domain filters in pairs, with one set of frequency domain filters for the left ear and one set of frequency domain filters for the right ear. The measured HRTFs 108 may be stored by the HRTF measurement equipment 102 as part of the training data 110.

Returning to FIG. 1, the training data 110 may further include the anthropometric feature parameters 112 of the training subjects 106. The anthropometric feature parameters 112 may be obtained using manual measuring tools (e.g., tape measures, rulers, etc.), questionnaires, and/or automated measurement tools. For example, a computer-vision based tool may include a camera system that captures images of the training subjects 106, such that an image processing algorithm may extract anthropometric measurements from the images. In other examples, other automated measurement tools that employ other sensing technologies, such as ultrasound, infrared and/or so forth, may be used to obtain anthropometric measurements of the training subjects 106. In some embodiments, the anthropometric feature parameters 112 may include one or more of the following parameters list below in Table I.

TABLE I

Anthropometric Feature parameters

Head-related features:

head height, width, depth, and circumference;
neck height, width, depth, and circumference;
distance between eyes/distance between ears;
maximum head width (including ears);
ear canals and eyes positions;
intertragal incisure width; inter-pupillary distance.

Ear-related features:

pinna: position offset (down/back); height; width; rotation angle;
cavum concha height and width;
cymba concha height; fossa height.

Limbs and full body features:

shoulder width, depth, and circumference;
torso height, width, depth, and circumference;
distances: foot-knee; knee-hip; elbow-wrist; wrist-fingertip; height.

Other features:

gender; age range; age; race;
hair color; eye color; weight; shirt size; shoe size.

The HRTF engine 104 may leverage the training data 110 to synthesize HRTFs for a test subject 114 based on the anthropometric feature parameters 118 obtained for the test subject 114. In various embodiments, the HRTF engine 104 may synthesize a set of personalized HRTFs for a left ear of the test subject 114 and/or a set of personalized HRTFs for the right ear of the test subject 114.

The HRTF engine 104 may be executed on one or more computing devices 116. The computing devices 116 may include general purpose computers, such as desktop computers, tablet computers, laptop computers, servers, and so forth. However, in other embodiments, the computing devices 116 may include smart phones, game consoles, or any other electronic devices. The anthropometrics feature parameters 118 may include one or more of the measurements listed in Table I. In various embodiments, the anthropometric feature parameters 118 may be obtained using manual measuring tools, questionnaires, and/or automated measurement tools.

The HRTF engine 104 may rely on the principle that the magnitudes and the phase delays of a particular set of HRTFs may be described by the same sparse combination as the corresponding anthropometric data. Accordingly, the HRTF engine 104 may derive a sparse vector that represents the anthropometric feature parameters 118 of the test subject 114. The sparse vector may represent the anthropometric feature parameters 118 as a linear superposition of the anthropometric feature parameters of a subset of the human subjects from the training data 110. Subsequently, the HRTF engine 104 may perform HRTF magnitude synthesis 120 by applying the sparse vector directly on the HRTF tensor data in the training data 110 to obtain a HRTF magnitude. Likewise, the HRTF engine 104 may perform HRTF phase synthesis 122 by applying the sparse vector directly on the HRTF group delay data in the training data 110 to obtain a HRTF phase. The HRTF engine 104 may further combine the HRTF magnitude and the HRTF phase to compute a personalized HRTF. The HRTF engine 104 may perform the synthesis process for each ear of the test subject 114.

Accordingly, personalized HRTFs 124 for the test subject 114 may include HRTFs for the left ear and/or the right ear of the test subject 114.

Example Components

Figure 3:
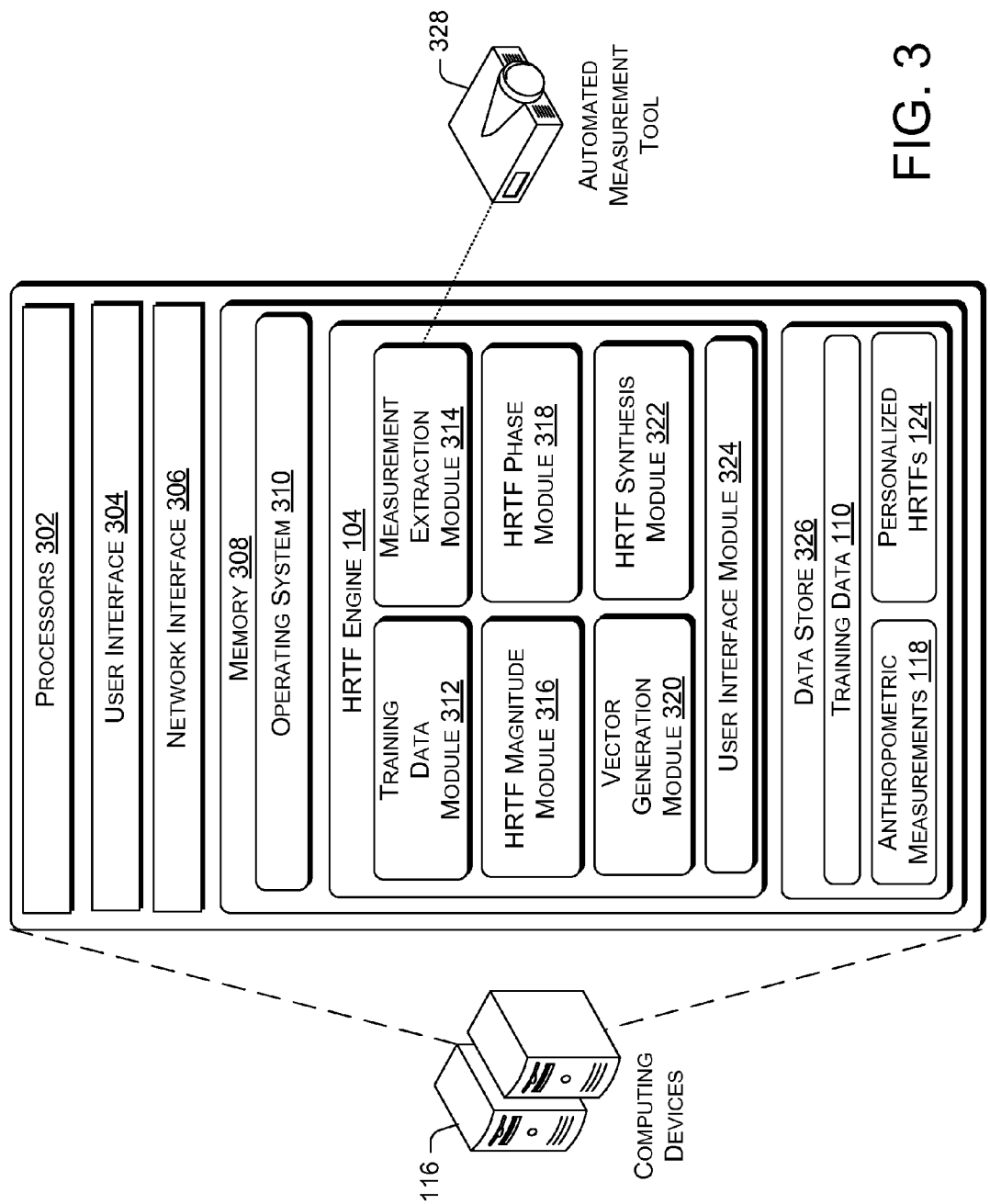
FIG. 3 is an illustrative diagram that shows example components of a HRTF engine that provides personalized HRTFs for a human subject based on the anthropometric feature parameters of the human subject.

FIG. 3 is an illustrative diagram that shows example components of a HRTF engine 104 that provides personalized HRTFs for a human subject based on the anthropometric feature parameters of the human subject. The HRTF engine 104 may be implemented by the one or more computing devices 116. The computing device 116 may include one or more processors 302, a user interface 304, a network interface 306, and memory 308. Each of the processors 302 may be a single-core processor or a multi-core processor. The user interface 304 may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices or other electronic/software selection methods.

The network interface 306 may include wired and/or wireless communication interface components that enable the computing devices 116 to transmit and receive data via a network. In various embodiments, the wireless interface component may include, but is not limited to cellular, Wi-Fi, Ultra-wideband (UWB), personal area networks (e.g., Bluetooth), satellite transmissions, and/or so forth. The wired interface component may include a direct I/O interface, such as an Ethernet interface, a serial interface, a Universal Serial Bus (USB) interface, and/or so forth. As such, the computing devices 116 may have network capabilities. For example, the computing devices 116 may exchange data with other electronic devices (e.g., laptops computers, desktop computers, mobile phones servers, etc.) via one or more networks, such as the Internet, mobile networks, wide area networks, local area networks, and so forth. Such electronic devices may include computing devices of the HRTF measuring equipment 102 and/or automated measurement tools.

The memory 308 may be implemented using computer-readable media, such as computer storage media. Computer-readable media includes, at least, two types of computer-readable media, namely computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

The memory 308 of the computing devices 116 may store an operating system 310 and modules that implement the HRTF engine 104. The modules may include a training data module 312, a measurement extraction module 314, a HRTF magnitude module 316, a HRTF phase module 318, a vector generation module 320, a HRTF synthesis module 322, and a user interface module 324. Each of the modules may include routines, programs instructions, objects, and/or data structures that perform particular tasks or implement particular abstract data types. Additionally, a data store 326 may reside in the memory 308.

The operating system 310 may include components that enable the computing devices 116 to receive data via various inputs (e.g., user controls, network interfaces, and/or memory devices), and process the data using the processors 302 to generate output. The operating system 310 may further include one or more components that present the output (e.g., display an image on an electronic display, store data in memory, transmit data to another electronic device, etc.). The operating system 310 may enable a user to interact with modules of the HRTF engine 104 using the user interface 304. Additionally, the operating system 310 may include other components that perform various other functions generally associated with an operating system.

The training data module 312 may obtain the measured HRTFs 108 from the HRTF measurement equipment 102. In turn, the training data module 312 may store the measured HRTFs 108 in the data store 322 as part of the training data 110. In various embodiments, given N training subjects 106, the HRTFs for each of the training subjects 106 may be encapsulated by a tensor of size D×K, where D is the number of HRTF directions and K is the number of frequency bins. The training data module 312 may stack the HRTFs of the training subjects 106 in a tensor $H \in \mathbb{R}^{N \times D \times K}$, such that the value $H_{n,d,k}$ corresponds to the k-th frequency bin for d-th HRTF direction of the n-th person.

The HRTF phase for each of the training subjects 106 may be described by a single interaural time delay (ITD) scaling factor for an average group delay. This is because HRTF phase response is mostly linear and listeners are generally insensitive to the details of the interaural phase spectrum as long as the ITD of the combined low-frequency part of a waveform is maintained. Accordingly, the phase response of HRTFs for a test subject may be modeled as a time delay that is dependent on the direction and the elevation of a sound source.

Additionally, ITD as a function of the direction and the elevation of a sound source may be assumed to be similar across multiple human subjects, with the scaling factor being the difference across the multiple human subjects. The scaling factor for a human subject may be dependent on the anthropometric features of the human subject, such as the size of the head and the positions of the ears. Thus, the individual feature of the HRTF phase response that varies for each human subject is a scaling factor. The scaling factor for a particular human subject may be a value that is multiplied with an average ITD of the multiple human subjects to derive an individual ITD for the particular human subject. As a result, the problem of personalizing HRTF phases to learn a single scaling factor for a human subject may be a function of the anthropometric features belonging to the human subject.

The training data module 312 may store the ITD scaling factors for the training subjects 106. Given N training subjects 106. The ITD scaling factors for the training subjects 106 may be stacked in a vector $H \in \mathbb{R}^N$, such that the value $H_n$ corresponds to the ITD scaling factor of the n-th person.

The training data module 312 may convert the categorical features (e.g., hair color, race, eye color, etc.) of the anthropometric feature parameters 112 into binary indicator variables. Alternatively or concurrently, the training data module 312 may apply a min-max normalization to each of the rest of the feature parameters separately to make the feature parameters more uniform. Accordingly, each training subject may be described by A anthropometric features, such that each training subject is viewed as a point in the space $[0,1]^A$. Additionally, the training data module 312 may arrange the anthropometric features in the training data 110 in a matrix $X \in [0,1]^{N \times A}$, in which one row of X represents all the features of one training subject.

The measurement extraction module 314 may obtain one or more of the anthropometric feature parameters 118 of the test subject 116 from an automated measurement tool 328. For example, an automated measurement tool 328 in the form of a computer-vision tool may capture images of the test subject 116 and extract anthropometric measurements from the images. The automated measurement tool 328 may pass the anthropometric measurements to the HRTF engine 104.

The HRTF magnitude module 316 may synthesize the HRTF magnitudes for an ear of the test subject 114 based on anthropometric features $y \in [0,1]^A$ of the test subject 114. The HRTF synthesis problem may be treated by the HRTF magnitude module 316 as finding a sparse representation of the anthropometric features of the test subject 114, in which the anthropometric features of the test subject 114 and the synthesized HRTFs share the same relationship and the training data 110 is sufficient to cover the anthropometric features of the test subject 114.

Accordingly, the HRTF magnitude module 316 may use the vector generation module 320 to learn a sparse vector= $[\beta_1, \beta_2, \ldots, \beta_N]^T$. The sparse vector may represent the anthropometric features of the test subject 114 as a linear superposition of the anthropometric features from the training data ($\hat{y} = \beta^T X$). This task may be reformulated as a minimization problem for a non-negative shrinking parameter $\lambda$:

$$\hat{\beta} = \mathrm{argmin}_{\beta}(\Sigma_{a=1}^{A}(y_a - \Sigma_{n=1}^{N}\beta_n X_{n,a})^2 + \lambda \Sigma_{n=1}^{N}|\beta_n|). \qquad (1)$$

The first part of equation (1) minimizes the differences between values of y and the new representation of y. The sparse vector $\in \mathbb{R}^N$ provides one weight value per each of the training subject 106, and not per anthropometric feature. The second part of the equation (1) is the $l_1$ norm regularization term that imposes the sparsity constraints, which makes the vector $\beta$ sparse. The shrinking parameter $\lambda$ in the regularization term controls the sparsity level of the model and the amount of the regularization. In some embodiments, the vector generation module 320 may tune the parameter $\lambda$ for the synthesis of HRTF magnitudes based on the training data 110. The tuning may be performed using a leave-one-person-out cross-validation approach. Accordingly, the vector generation module 320 may select a parameter $\lambda$ that provides the smallest cross-validation error. In at least one embodiment, the cross-validation error may be calculated as the root mean square error, using the following equation:

$$LSD(H, \hat{H}) = \sqrt{\frac{1}{D}\Sigma_{d=1}^{D}(LSD_d(H, \hat{H}))^2} \text{ [dB]}, \qquad (2)$$

in which the log-spectral distortion (LSD) is a distance measure between two HRTFs for a given sound source direction d and all frequency bins from the range $k_1$ to $k_2$, and D is the number of available HRTF directions.

In various embodiments, the vector generation module 320 may solve the minimization problem using the Least Absolute Shrinkage and Selection Operator (LASSO), or using a similar technique. The HRTFs of the test subject 114 share the same relationship as the anthropometric features of the test subject 114. Accordingly, once the vector generation module 320 learns the sparse vector β from the anthropometric features of the test subject 114, the HRTF magnitude module 316 may apply the learned sparse vector β directly to the HRTF tensor data included in the training data 110 to synthesize HRTF values Ĥ for the test subject 114 as follows:

$$\hat{H}_{d,k} = \Sigma_{n=1}^{N} \beta_n H_{n,d,k}, \quad (3)$$

in which $\hat{H}_{d,k}$ corresponds to k-th frequency bin for d-th HRTF direction of a synthesized HRTF.

In some embodiments, the minimization problem that represents that task may include a non-negative sparse representation. The non-negative sparse representation may ensure that the weight values provided by the sparse vector $\in \mathbb{R}^N$ are non-negative. Accordingly, the minimization problem for the non-negative shrinking parameter λ may be redefined as:

$$\hat{\beta} = \text{argmin}_\beta (\Sigma_{a=1}^{A} (\gamma_a - \Sigma_{n=1}^{N} \beta_n X_{n,a})^2 + \lambda \Sigma_{n=1}^{N} |\beta_n|),$$

subject to $\forall_{n=1}^{N} \beta_n \geq 0$. (4)

As such, the vector generation module 320 may solve this minimization problem in a similar manner as the minimization problem defined by equation (1) using the Least Absolute Shrinkage and Selection Operator (LASSO), with the optional tuning of the parameter on the training data 110 using a leave-one-person-out cross-validation approach.

In alternative embodiments, the $l_1$ norm regularization term, i.e., sparse representation, that is in the minimization problem defined by equation (1) may be replaced with the $l_2$ norm regularization term, i.e., ridge regression. Such a replacement may remove the imposition of sparsity in the model. Accordingly, the minimization problem for the non-negative shrinking parameter λ may be redefined as:

$$\hat{\beta} = \text{argmin}_\beta (\Sigma_{a=1}^{A} (\gamma_a - \Sigma_{n=1}^{N} \beta_n X_{n,a})^2 + \lambda \Sigma_{n=1}^{N} \beta_n^2), \quad (5)$$

in which the shrinkage parameter λ controls the size of the coefficients and the amount of the regularization, with the tuning of the parameter λ on the training data 110 using a leave-one-person-out cross-validation approach. Since this minimization problem is convex, the vector generation module 320 may solve this minimization problem to generate a unique learned vector β as the solution.

The HRTF phase module 318 may estimate an ITD scaling factor for an ear of the test subject 114 given the anthropometric features $y \in [0,1]^A$ of the test subject 114. The ITD scaling factor estimation problem may be treated by the HRTF phase module 318 as finding a sparse representation of the anthropometric features of the test subject 114. Thus, the ITD scaling factor estimation problem may be solved with the assumptions that the anthropometric features of the test subject 114 and the ITD scaling factors of the test subject 114 share the same relationship and the training data 110 is sufficient to cover the anthropometric features of the test subject 114.

Accordingly, the vector generation module 320 may provide the learned sparse vector β for the test subject 114 to the HRTF phase module 318. The learned sparse vector β provided to the HRTF phase module 318 may be learned in a similar manner as the sparse vector β provided to the HRTF magnitude module 316, i.e., solving a minimization problem for a non-negative shrinking parameter λ. However, in some embodiments, the vector generation module 320 may tune the parameter λ for the estimation of ITD scaling values based on the training data 110. The tuning may be performed using an implementation of the leave-one-person-out cross-validation approach. In the implementation, the vector generation module 320 may take out the data associated with a single training subject from the training data 110, estimate the sparse weighting vector using equation (1), and then estimate the scaling factor. The vector generation module 320 may repeat this process for all training subjects and the optimal λ for the training data 110 may be selected from a series of λ values as the value of λ which gives minimal error according to the following root mean square error equation:

$$\varepsilon = \sqrt{\frac{1}{N} \Sigma_{n=1}^{N} (\hat{h}_n - h_n)^2}, \quad (6)$$

in which $\hat{h}_n$ is the estimated scaling factor for the n-th training subject and $h_n$ is the measured scaling factor for the same training subject.

Once the vector generation module 320 learns the sparse vector β, the HRTF phase module 318 may apply the learned sparse vector β directly to the ITD scaling factors data in the training data 110 to estimate the ITD scaling factor value ĥ for the test subject 114 as follows:

$$\hat{h} = \Sigma_{n=1}^{N} \beta_n h_n. \quad (7)$$

In various embodiments, the HRTF phase module 318 may multiply the scaling factor value ĥ and the average ITD to estimate the time delay as a function of the direction and the elevation of the test subject 114. Subsequently, the HRTF phase module 318 may convert the time delay into a phase response for an ear of the test subject 114.

The HRTF synthesis module 322 may combine each of the HRTF values Ĥ with a corresponding scaling factor value ĥ for an ear of the test subject 114 to obtain a personalized HRTF for the ear of the test subject 114. In various embodiments, each of the HRTF values Ĥ and its corresponding scaling factor value ĥ may be complex numbers. The HRTF synthesis module 322 may repeat such synthesis with respect to additional HRTF values to generate multiple HRTF values for multiple frequencies. Further, the steps performed by the various modules of the HRTF engine 104 may be repeated to generate additional HRTF values for the other ear of the test subject 114. In this way, the HRTF engine 104 may generate the personalized HRTFs 124 for the test subject 114.

The user interface module 324 may enable a user to use the user interface 304 to interact with the modules of the HRTF engine 104. For example, the user interface module 324 may enable the user to input anthropometric feature parameters of the training subjects 106 and the test subject 114 into the HRTF engine 104. In another example, the HRTF engine 104 may cause the user interface module 324 to show one or more questionnaires regarding anthropometric features of a test subject, such that the test subject is prompted to input one or more anthropometric feature parameters into the HRTF engine 104. In some embodiments, the user may also use the user interface module 324 to adjust the various parameters and/or models used by the modules of the HRTF engine 104.

The data store 326 may store data that are used by the various modules. In various embodiments, the data store may store the training data 110, the anthropometric measurements of test subjects, such as the test subject 114. The data store may also store the personalized HRTFs that are generated for the test subjects, such as the personalized HRTFs 124.

Example Processes

Figure 4:
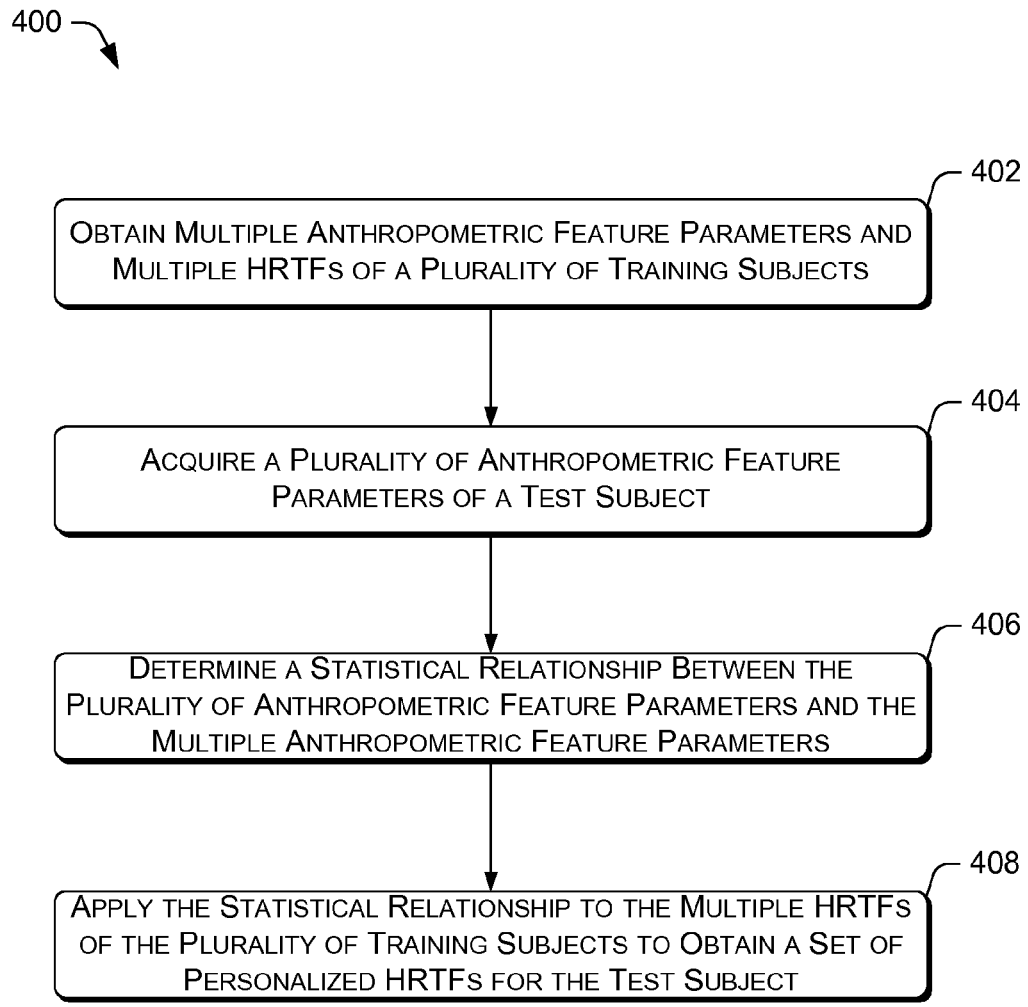
FIG. 4 is a flow diagram that illustrates an example process for using the anthropometric feature parameters of a human subject to derive personalized HRTFs for the human subject.
Figure 5:
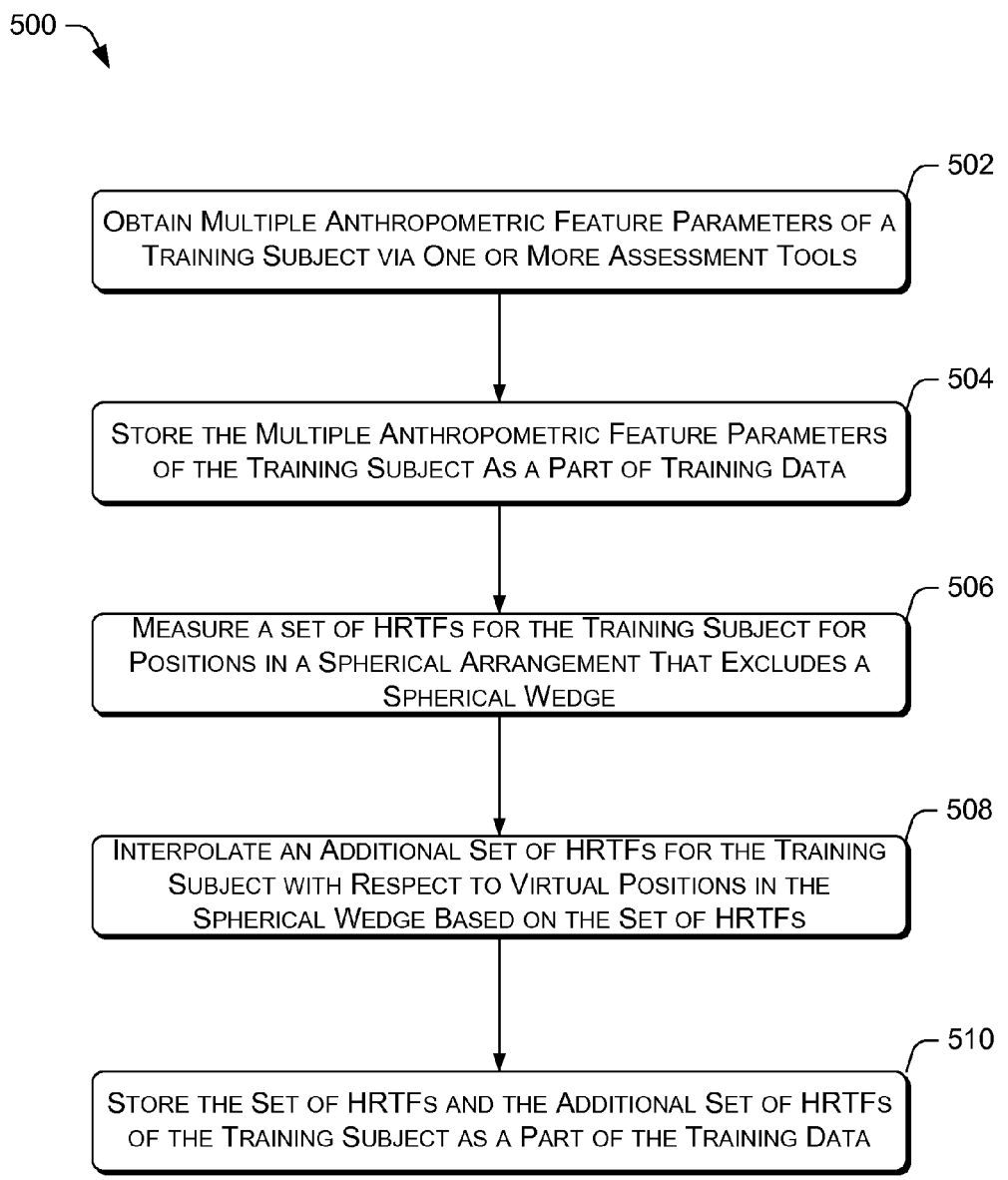
FIG. 5 is a flow diagram that illustrates an example process for obtaining anthropometric feature parameters and HRTFs of a training subject.
Figure 6:
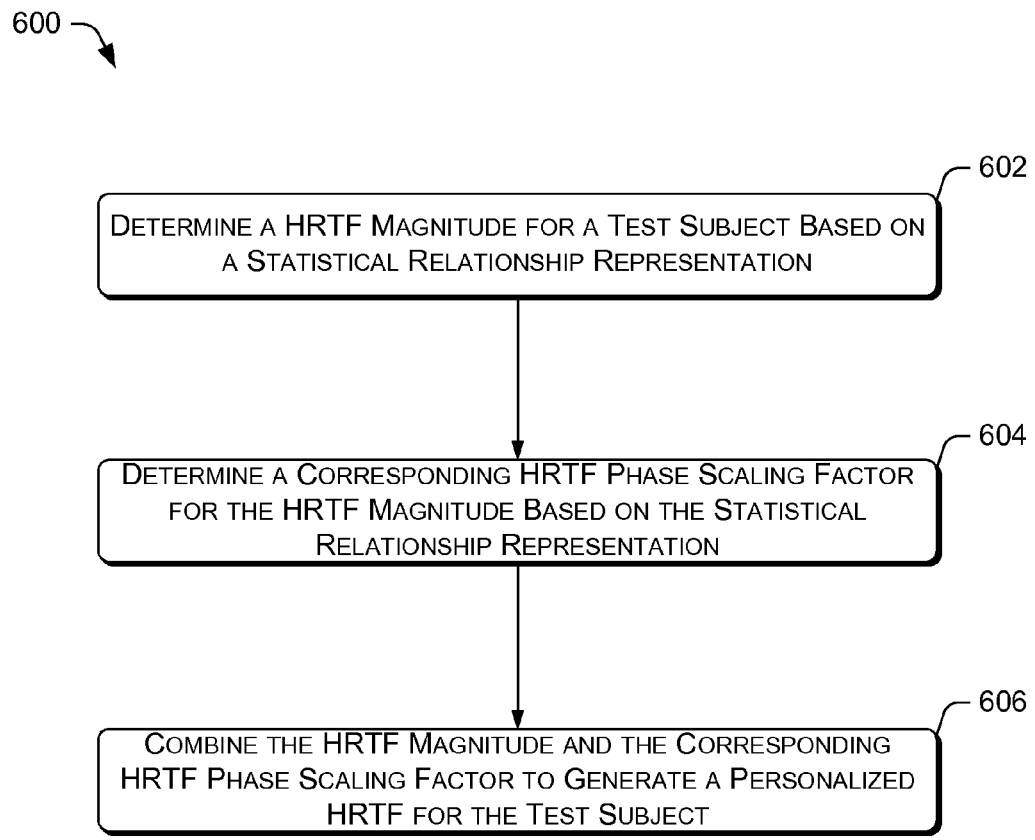
FIG. 6 is a flow diagram that illustrates an example process for generating a personalized HRTF for a test subject.

FIGS. 4-6 describe various example processes for generating personalized HRTFs for a human subject based on a statistical relationship between the anthropometric features of the human subject and the anthropometric features of multiple human subjects. The order in which the operations are described in each example process is not intended to be construed as a limitation, and any number of the described operations may be combined in any order and/or in parallel to implement each process. Moreover, the operations in each of the FIGS. 4-6 may be implemented in hardware, software, and a combination thereof. In the context of software, the operations represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 4 is a flow diagram that illustrates an example process 400 for using the anthropometric feature parameters of a human subject to derive personalized HRTFs for a human subject. At block 402, the HRTF engine 104 may obtain multiple anthropometric feature parameters and multiple HRTFs of a plurality of training subjects. For example, the HRTF engine 104 may obtain the measured HRTFs 108 and the anthropometric feature parameters 112 of the training subjects 106. In various embodiments, the HRTF engine 104 may store measured HRTFs 108 and the anthropometric feature parameters 112 as training data 110.

At block 404, the HRTF engine 104 may acquire a plurality of anthropometric feature parameters of a test subject. For example, the HRTF engine 104 may ascertain the anthropometric feature parameters 118 of the test subject 114. In some embodiments, one or more anthropometric feature parameters may be manually inputted into the HRTF engine 104 by a user. Alternatively or concurrently, an automated measurement tool may automatically detect the one or more anthropometric feature parameters and provide them to the HRTF engine 104.

At block 406, the HRTF engine 104 may determine a statistical relationship between the plurality of anthropometric feature parameters of the test subject and the multiple anthropometric feature parameters of the plurality of training subjects. For example, the HRTF engine 104 may rely on the principle that the magnitudes and the phase delays of a particular set of HRTFs may be described by the same sparse combination as the corresponding anthropometric data. In various embodiments, the statistical relationship may be determined using sparse representation modeling or ridge regression modeling.

At block 408, the HRTF engine 104 may apply the statistical relationship to the multiple HRTFs of the plurality of training subjects to obtain a set of personalized HRTFs for the test subject. The personalized HRTFs may be used to modify a non-spatial audio-signal to simulate 3-dimensional sound for the test subject using a pair of audio speakers.

FIG. 5 is a flow diagram that illustrates an example process 500 for obtaining anthropometric feature parameters and HRTFs of a training subject. The example process 500 further describes block 402 of the process 400. At block 502, the HRTF engine 104 may obtain multiple anthropometric feature parameters of a training subject, such as one of the training subjects 106, via one or more assessment tools. The assessment tools may include an automated measurement tool that automatically detects the one or more anthropometric features of the test subject. The assessment tools may include a user interface that shows one or more questionnaires regarding anthropometric features of a training subject, such that the training subject is prompted to input one or more anthropometric feature parameters into the HRTF engine 104. The assessment tools may also include a user interface that enables a user to input anthropometric feature parameters regarding the training subject after the user has measured or otherwise determined the anthropometric feature parameters.

At block 504, the HRTF engine 104 may store the multiple anthropometric feature parameters of the training subject as a part of the training data 110. In various embodiments, the HRTF engine 104 may convert the categorical features (e.g., hair color, race, eye color, etc.) of the anthropometric feature parameters 112 into binary indicator variables. Alternatively or concurrently, the HRTF engine 104 may apply a min-max normalization to each of the rest of the feature parameters separately to make the feature parameters more uniform.

At block 506, the HRTF engine 104 may obtain a set of HRTFs for the training subject via measures of sounds that are transmitted to the ears of the training subject from positions in a spherical arrangement that partially surrounds the training subject. The partially surrounding spherical arrangement may exclude a spherical wedge. In some embodiments, the training subject may sit in a chair with his or her head fixed in the center of an arc array of loud speakers. Chirp signals of multiple frequencies played by the loudspeakers may be recorded with omni-directional microphones that are placed in the ear canal entrances of the seated training subject. For example, in an instance in which the chirp signals are emanating from an array of 16 loudspeakers that are moved to 25 array positions, the HRTFs may be measured at a total of 400 positions for the training subject.

At block 508, the HRTF engine 104 may interpolate an additional set of HRTFs for the training subject with respect to virtual positions in the spherical wedge based on the set of HRTFs. In various embodiments, the interpolated set of HRTFs may be estimated based on the set of HRTFs using a lower-order non-regularized least-squares fit technique. The HRTFs of each training subject may be represented as a set of frequency domain filters in pairs.

At block 510, the HRTF engine 104 may store the set of HRTFs and the additional set of HRTFs of the training subject as a part of the training data 110. For example, the HRTFs of the training subject may be encapsulated by a tensor of size D×K, where D is the number of HRTF directions and K is the number of frequency bins.

FIG. 6 is a flow diagram that illustrates an example process 600 for generating a personalized HRTF for a test subject. The example process 600 further describes block 408 of the process 400. At block 602, the HRTF engine 104 may determine a HRTF magnitude for a test subject (e.g., test subject 114) based on a statistical relationship representation. In various embodiments, the statistical relationship may be a relationship between the plurality of anthropometric feature parameters of the test subject and one or more of the multiple anthropometric feature parameters of the plurality of training subjects.

Thus, in some embodiments, the statistical relationship may consist of a statistical model that jointly describes both the anthropometric features of the test subject and the HRTFs of the test subject. In other embodiments, the anthropometric features of the test subject and the HRTFs of the test subject may be described using other statistical relationships, such as Bayesian networks, dependency networks, and so forth. The statistical relationship may be determined using sparse representation modeling or ridge regression modeling. The HRTF engine 104 may determine the HRTF magnitude by applying the statistical relationship representation directly to the HRTF tensor data in the training data 110 to obtain the HRTF magnitude.

At block 604, the HRTF engine 104 may determine a corresponding HRTF scaling factor for the HRTF magnitude based on a statistical relationship representation. The scaling factor for the test subject is a value that is multiplied with an average ITD for the multiple human subjects to derive an individual ITD for the test subject. In various embodiments, the HRTF engine 104 may apply the statistical relationship representation directly to the ITD scaling factors data included in the training data 110 to estimate the ITD scaling factor value for the test subject. Subsequently, the HRTF engine 104 may convert the time delay as a phase response for an ear of the test subject.

At block 606, the HRTF engine 104 may combine the HRTF magnitude and the corresponding HRTF phase scaling factor to generate a personalized HRTF for the test subject.

The use of the techniques described herein may enable the rapid derivation of personalized HRTFs for a human subject based on the anthropometric feature parameters of the human subject. Accordingly, this means that the HRTFs for the human subject may be obtained without the use of specialized acoustic measuring equipment in an anechoic environment. The relative ease at which the personalized HRTFs are obtained for human subjects may lead to the widespread use of personalized HRTFs to develop personalized 3-dimensional audio experiences.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

What is claimed is:
1. One or more computer storage media storing computer-executable instructions that are executable to cause one or more processors to perform acts comprising:
    obtaining multiple anthropometric feature parameters and multiple Head-related Transfer Functions (HRTFs) of a plurality of training subjects;
    acquiring a plurality of anthropometric feature parameters of a test subject;
    determining a representation of a statistical relationship between the plurality of anthropometric feature parameters of the test subject and a subset of the multiple anthropometric feature parameters belonging to the plurality of training subjects; and
    applying the representation of the statistical relationship to the multiple HRTFs of the plurality of training subjects, which modifies the multiple HRTFs of the plurality of training subjects, to obtain a set of personalized HRTFs for the test subject.
2. The one or more computer storage media of claim 1, further comprising generating 3-dimensional sound for the test subject using at least a pair of speakers based at least on the set of personalized HRTFs for the test subject.

3. The one or more computer storage media of claim 1, wherein the determining the representation of the statistical relationship includes learning a sparse representation or a ridge regression representation of the plurality of the anthropometric feature parameters of the test subject as a linear superposition of the subset of the multiple anthropometric feature parameters belonging to the plurality of training subjects.

4. The one or more computer storage media of claim wherein the learning the sparse representation includes using a non-negative sparse representation term in a minimization problem for learning the representation of the statistical relationship to ensure that weight values of the sparse representation are positive.

5. The one or more computer storage media of claim 1, wherein the applying includes applying the statistical relationship to obtain a set of personalized HRTFs for at least one of a left ear or a right ear of the test subject.

6. The one or more computer storage media of claim 1, wherein the applying the representation of the statistical relationship includes:
    determining a HRTF magnitude for the test subject representation by applying the representation of the statistical relationship to the multiple HRTFs of the plurality of training subjects;
    determining a corresponding HRTF phase scaling factor for the HRTF magnitude by applying the representation of the statistical relationship to interaural time delay (ITD) data of the plurality of training subjects; and
    combining the HRTF magnitude and the corresponding HRTF phase scaling factor to generate a personalized HRTF for the test subject.

7. The one or more computer storage media of claim 1, wherein the obtaining includes:
    obtaining the multiple anthropometric feature parameters of a training subject via at least one of user input or an input from an automated measurement tool;
    storing the multiple anthropometric feature parameters of the training subject;
    obtaining a set of HRTFs for the training subject via measurement of sounds transmitted to ears of the training subject from a plurality of positions in a spherical arrangement that excludes a spherical wedge;
    interpolating an additional set of HRTFs for the training subject with respect to virtual positions in the spherical wedge based on the set of the HRTFs; and
    storing the set of HRTFs and the additional set of HRTFs of the training subject.

8. The one or more computer storage media of claim 1, wherein the determining the representation of the statistical relationship includes solving a minimization problem for a non-negative shrinking parameter that is tuned using a leave-one-person-out cross-validation approach.

9. A computer-implemented method, comprising:
    obtaining multiple anthropometric feature parameters and multiple Head-related Transfer Functions (HRTFs) of a plurality of training subjects;
    acquiring a plurality of anthropometric feature parameters of a test subject;
    determining a sparse representation of the plurality of anthropometric feature parameters of the test subject, the sparse representation representing the plurality of anthropometric features of the test subject based at least on a subset of the multiple anthropometric feature parameters belonging to the plurality of training subjects; and
applying the sparse representation to the multiple HRTFs of the plurality of training subjects, which modifies the multiple HRTFs of the plurality of training subjects, to obtain a set of personalized HRTFs for the test subject.

10. The computer-implemented method of claim 9, wherein the acquiring includes acquiring the plurality of anthropometric feature parameters of the test subject via at least one of user input or an input from an automated measurement tool.

11. The computer-implemented method of claim 9, wherein the sparse representation represents the plurality of anthropometric features of the test subject as a linear superposition of the subset of the multiple anthropometric feature parameters belonging to the plurality of training subjects.

12. The computer-implemented method of claim 9, wherein the determining the sparse representation includes using a non-negative sparse representation term in a minimization problem for learning the sparse representation to ensure that weight values of the sparse representation are positive.

13. The computer-implemented method of claim 9, wherein the applying the representation of a statistical relationship includes:
determining a HRTF magnitude for the test subject representation by applying the sparse representation to the multiple HRTFs of the plurality of training subjects;
determining a corresponding HRTF phase scaling factor for the HRTF magnitude by applying the sparse representation to interaural time delay (ITD) data of the plurality of training subjects; and
combining the HRTF magnitude and the corresponding HRTF phase scaling factor to generate a personalized HRTF for the test subject.

14. The computer-implemented method of claim 9, wherein the obtaining includes:
obtaining the multiple anthropometric feature parameters of a training subject via at least one of user input or an input from an automated measurement tool;
storing the multiple anthropometric feature parameters of the training subject; obtaining a set of HRTFs for the training subject via measurement of sounds transmitted to ears of the training subject from a plurality of positions in a spherical arrangement that excludes a spherical wedge;
interpolating an additional set of HRTFs for the training subject with respect to virtual positions in the spherical wedge based on the set of the HRTFs; and
storing the set of HRTFs and the additional set of HRTFs of the training subject.

15. The computer-implemented method of claim 9, wherein the determining the sparse representation includes solving a minimization problem for a non-negative shrinking parameter that is tuned using a leave-one-person-out cross-validation approach.

16. A system,
comprising:
a plurality of processors;
a memory that includes a plurality of computer-executable components that are executable by the plurality of processors to perform a plurality of actions, the plurality of actions comprising:
obtaining multiple anthropometric feature parameters and multiple Head-related Transfer Functions (HRTFs) of a plurality of training subjects;
acquiring a plurality of anthropometric feature parameters of a test subject; determining a ridge regression representation of the plurality of anthropometric feature parameters of the test subject, the ridge regression representation representing the plurality of anthropometric features of the test subject based at least on a subset of the multiple anthropometric feature parameters belonging to the plurality of training subjects; and
applying the ridge regression representation to the multiple HRTFs of the plurality of training subjects to obtain a set of personalized HRTFs for the test subject.

17. The system of claim 16, wherein the acquiring includes acquiring the plurality of anthropometric feature parameters of the test subject via at least one of user input or an input from an automated measurement tool.

18. The system of claim 16, wherein the ridge regression representation represents the plurality of anthropometric features of the test subject as a linear superposition of the subset of the multiple anthropometric feature parameters belonging to the plurality of training subjects.

19. The system of claim 16, wherein the applying the ridge regression representation includes:
determining a HRTF magnitude for the test subject representation by applying the ridge regression representation to the multiple HRTFs of the plurality of training subjects;
determining a corresponding HRTF phase scaling factor for the HRTF magnitude by applying the ridge regression representation to interaural time delay (ITD) data of the plurality of training subjects; and
combining the HRTF magnitude and the corresponding HRTF phase scaling factor to generate a personalized HRTF for the test subject.

20. The system of claim 16, wherein the obtaining includes:
obtaining the multiple anthropometric feature parameters of a training subject via at least one of user input or an input from an automated measurement tool;
storing the multiple anthropometric feature parameters of the training subject; obtaining a set of HRTFs for the training subject via measurement of sounds transmitted to ears of the training subject from a plurality of positions in a spherical arrangement that excludes a spherical wedge;
interpolating a complementary set of HRTFs for the training subject with respect to virtual positions in the spherical wedge based on the set of the HRTFs; and
storing the set of HRTFs and the additional set of HRTFs of the training subject.

* * * * *